May 3, 1927.  
A. D. FORRY  
1,626,806  
IMPLEMENT FOR CUTTING AND OPENING PASTEBOARD BOXES  
Filed Feb. 18, 1926
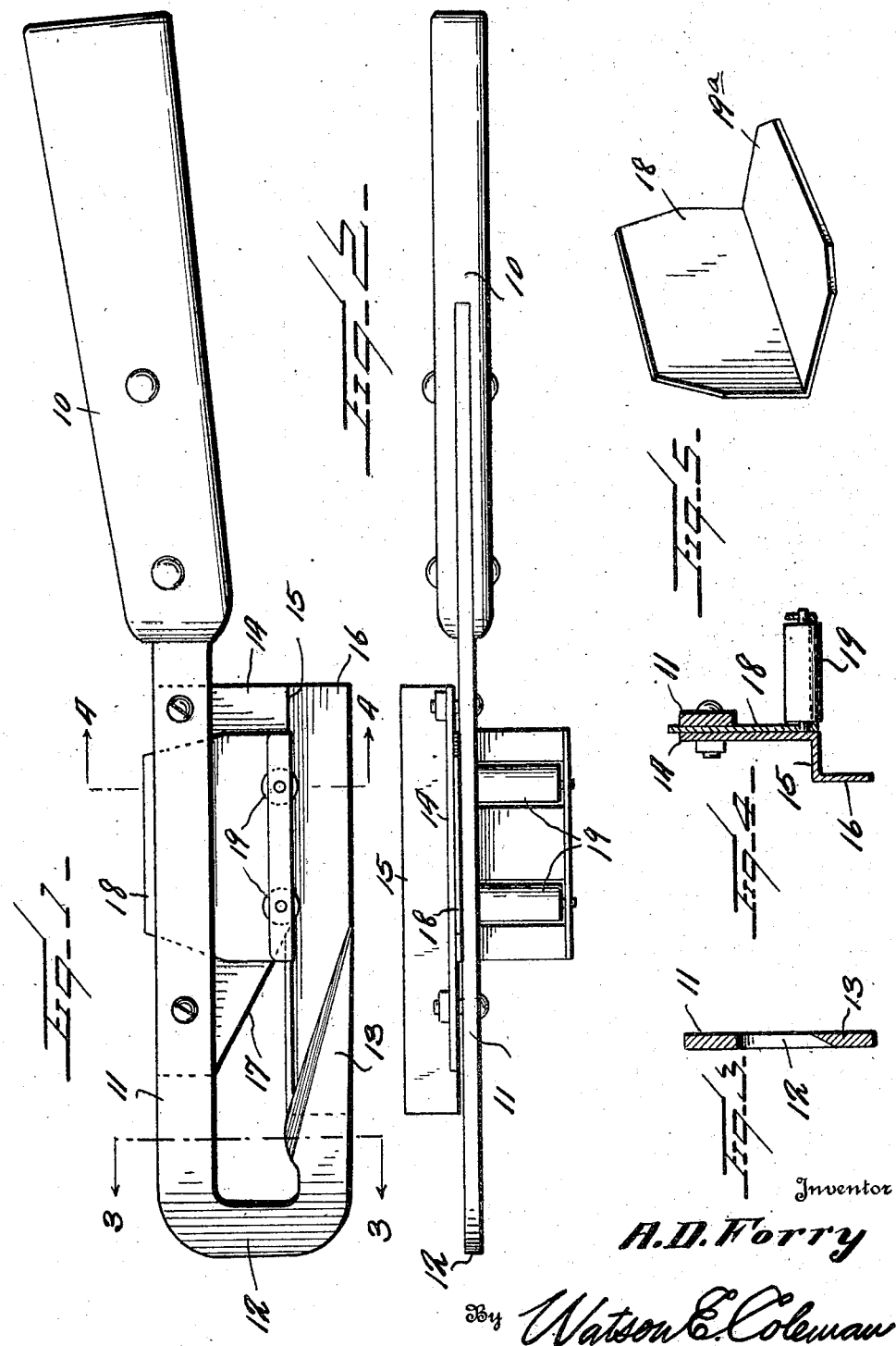
Inventor  
A. D. Forry  
By Watson E. Coleman  
Attorney Patented May 3, 1927.

1,626,806

UNITED STATES PATENT OFFICE.

ARCHIE D. FORRY, OF CLARKSVILLE, IOWA.

IMPLEMENT FOR CUTTING AND OPENING PASTEBOARD BOXES.

Application filed February 18, 1926. Serial No. 89,181.

This invention relates to implements for cutting and opening pasteboard boxes or the like and the general object of the invention is to provide a device of this character which is particularly convenient in opening large and heavy pasteboard boxes and thoroughly effective in use and which is provided with a guide whereby the knife may be positioned adjacent the corner of the box being cut and whereby the knife may be disposed in a vertical position and prevented from entering to too great a depth into the box being cut.

My invention is illustrated in the accompanying drawing, wherein:—

Figure 1 is a side elevation of a box opening implement constructed in accordance with my invention;

Fig. 2 is a top plan view of the structure shown in Figure 1;

Fig. 3 is a section on the line 3—3 of Figure 1;

Fig. 4 is a section on the line 4—4 of Figure 1;

Fig. 5 is a perspective view of the modified form of stop;

Referring to this drawing, it will be seen that my improved implement comprises a handle 10 having extending axially therefrom a shank 11, the shank being bent downwardly upon itself and then extended parallel to the body of the shank, as at 12, and formed to provide a blade 13, the upper edge of which is sharpened and said cutting edge extending downward and forward at an angle to a horizontal plane.

Riveted, bolted or otherwise attached to the shank 11 is a plate 14 which is angularly bent at 15 in a horizontal plane and then downwardly extended, as at 16. Preferably, the forward edge of the plate is cut-away, as at 17, down to this horizontal angular portion 15, said cut extending inward to a point approximately above the point of the blade 13.

Mounted upon the shank 11 or upon the plate 14 is a stop comprising a vertically disposed plate 18 which may be inserted between the shank and plate 14, this plate or equivalent member 18 being provided preferably with laterally extending rollers 19 which are adapted to bear against the upper surface of the body of the box or against the surface upon which the knife or implement is being used. While preferably I use rollers 19 as stops limiting the depression of the knife into the box, I do not wish to be limited to this as I may use an angular plate. Thus, the plate 18 may be formed with an angular flange 19ª and this flange act as a stop.

In the use of this device, the knife is drawn downward so as to insert its point into the wall of the box adjacent the corner thereof and then the knife turned into a horizontal position with the guide flange 15 resting upon the top of the box and the flange 16 extending down against the side of the box, the stop under these circumstances bearing against the top of the box. The knife is then drawn longitudinally along the box and the cutting edge of the blade 13, which intersects the wall to be cut, cuts this wall as the knife is drawn forward. The gauge or stop formed by the rollers 19 or the plate 19ª prevent the knife from running too deeply into the box or injuring the contents thereof.

I claim:—

1. An implement for cutting open pasteboard boxes comprising a handle, a shank extending therefrom, the shank being returned upon itself and formed with a knife blade having its back extending parallel to the shank and having an upwardly facing, upwardly and rearwardly inclined knife edge, and a straight longitudinally extending box engaging guide attached to the shank and extending parallel thereto, the guide being angular in cross section to provide a portion adapted to rest upon the top of a box and a portion adapted to rest against the side of the box, the first named portion being disposed below and intersecting the inner upper end of the knife edge.

2. An implement for cutting open pasteboard boxes comprising a handle, a shank extending therefrom and returned upon itself, this returned portion being formed with a knife blade having its back extending parallel to the shank and having an upwardly facing, upwardly and rearwardly inclined edge, and a straight longitudinally extending box engaging guide attached to the shank and extending parallel thereto, the margin of said guide being angularly bent laterally and then downwardly, the laterally extending portion of said guide intersecting the upper end of the blade.

3. An implement for cutting open pasteboard boxes comprising a handle, a shank extending from the handle and returned upon itself and formed with a knife blade having an upwardly facing downwardly and forwardly inclined edge, a box engaging guide attached to the shank and a box engaging stop attached to the shank and comprising a plate extending downward from the shank and having a laterally projecting box engaging portion.

4. An implement for cutting open pasteboard boxes comprising a handle, a shank extending from the handle and returned upon itself and formed with a knife blade having an upwardly facing downwardly and forwardly inclined edge, a box engaging guide attached to the shank and a box engaging stop attached to the shank and comprising a plate extending downward from the shank and having a plurality of laterally projecting rollers.

5. An implement for cutting open pasteboard boxes comprising a handle, a shank extending from the handle and returned upon itself and formed with a knife blade having an upwardly facing downwardly and forwardly inclined edge and a box engaging guide attached to the shank and comprising a plate extending downward from the shank toward the blade, said plate being angularly bent to engage the corner of the box, said plate at its end opposite the extremity of the knife being cut-away to provide an opening whose lower wall is formed by the laterally extending flange, said cut-away portion extending inward to a point opposite the point of the knife.

In testimony whereof I hereunto affix my signature.

ARCHIE D. FORRY.